United States Patent [19]

Hunt

[11] Patent Number: 5,488,926

[45] Date of Patent: Feb. 6, 1996

[54] ADJUSTABLE LIVESTOCK STAND

[76] Inventor: Roy H. Hunt, 2361 10th St. West, Rosamond, Calif. 93560

[21] Appl. No.: 239,691

[22] Filed: May 9, 1994

Related U.S. Application Data

[63] Continuation-in-part of Ser. No. 3,458, Jan. 12, 1993, Pat. No. 5,329,882.

[51] Int. Cl.$^6$ .................................................. A01K 13/00
[52] U.S. Cl. .................................... 119/756; 108/133
[58] Field of Search .................................... 119/753, 755, 119/756, 757; 108/133, 117, 131; 248/411, 413, 354.4

[56] References Cited

U.S. PATENT DOCUMENTS

| | | |
|---|---|---|
| 266,016 | 10/1982 | Cook . |
| 1,401,393 | 12/1921 | Cross ..................................... 119/755 |
| 1,705,115 | 3/1929 | Hollestelle . |
| 2,319,938 | 5/1943 | Markins . |
| 2,804,845 | 9/1957 | Plumley et al. ........................ 119/756 |
| 2,945,660 | 7/1960 | Slavsky et al. . |
| 3,137,273 | 6/1964 | Greenwood . |
| 3,262,666 | 7/1966 | Solum . |
| 3,483,846 | 12/1969 | Quint . |
| 3,524,434 | 8/1970 | Finley ..................................... 119/756 |
| 3,635,199 | 1/1972 | Fortney . |
| 3,693,595 | 9/1972 | Stewart . |
| 3,717,128 | 2/1973 | Pearman et al. . |
| 3,744,457 | 7/1973 | Heine et al. ............................. 119/756 |
| 3,777,715 | 12/1973 | Hill et al. . |
| 4,003,341 | 1/1977 | La Croix ................................. 119/756 |
| 4,186,690 | 2/1980 | Seiler . |
| 4,274,366 | 6/1981 | Adam . |
| 4,417,744 | 11/1983 | Spear ..................................... 248/411 |
| 4,484,705 | 11/1984 | Sande . |
| 4,494,465 | 1/1985 | Fick, Jr. ................................. 108/131 |
| 4,549,501 | 10/1985 | Anderson et al. . |
| 4,666,118 | 5/1987 | Busche . |
| 4,771,737 | 9/1988 | Lynch . |
| 4,942,846 | 7/1990 | Reinhold et al. . |

FOREIGN PATENT DOCUMENTS

| | | |
|---|---|---|
| 18459/34 | 7/1934 | Australia . |
| 43911 | 3/1971 | Finland . |

*Primary Examiner*—Todd E. Manahan
*Attorney, Agent, or Firm*—Kelly, Bauersfeld & Lowry

[57] ABSTRACT

A livestock stand includes a platform having a perforated aluminum sheet upper supporting surface, a headrest assembly, and front and rear leg assemblies connected to the platform, each being pivotable between a first folded position and a second extended position. The headrest assembly includes a livestock headrest connected to a support arm which, in turn, is connected to the platform. Clamp assemblies are provided to permit the support arm to be adjustably positioned relative to the platform, as well as to permit the headrest to be adjustably positioned relative to the support arm. The clamp assemblies have a rigid envelope through which either the support arm or a mounting channel for the livestock headrest slide, and a clamp screw including a friction locking plug. Each leg assembly may be secured in its first and second positions utilizing a spring-loaded lock. The leg assemblies are vertically adjustable to raise and lower the level of the upper supporting surface of the platform.

19 Claims, 2 Drawing Sheets

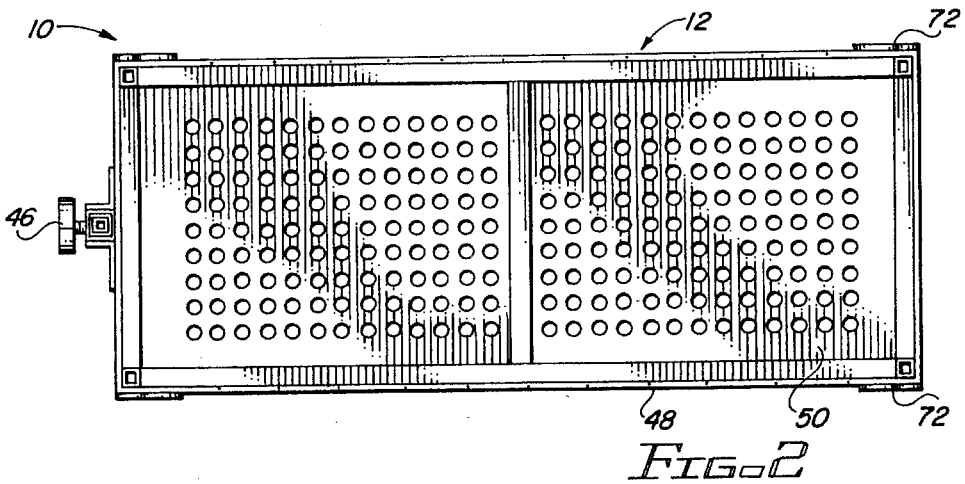
Fig-2
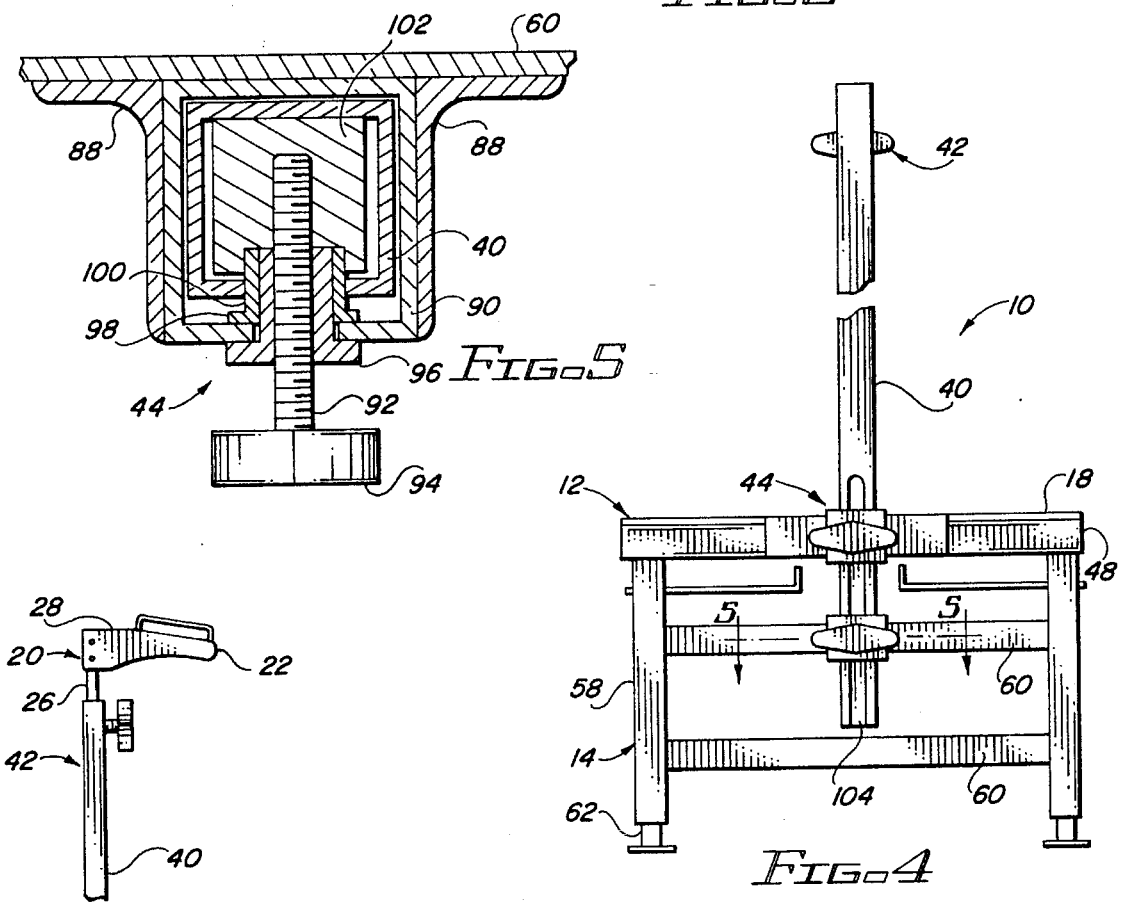
Fig-5
Fig-4
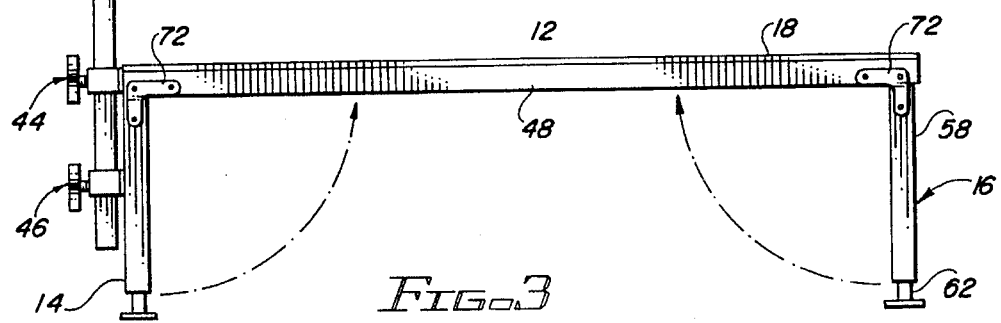
Fig-3

ADJUSTABLE LIVESTOCK STAND

RELATED APPLICATION

This is a continuation-in-part of U.S. patent application Ser. No. 08/003,458, filed Jan. 12, 1993 for SMALL LIVESTOCK HEAD RESTRAINT DEVICE (U.S. Pat. No. 5,329,882).

BACKGROUND OF THE INVENTION

This invention relates generally to livestock blocking and trimming stands which are principally utilized when showing, grooming, shearing or inoculating an animal such as a sheep or a calf. More specifically, the present invention relates to an adjustable livestock stand which may be easily configured to facilitate transportation and storage thereof, and when fully assembled permits adjustments to accommodate livestock of different sizes as well as different user preferences.

In handling livestock it is often desirable to hold an animal by the head while performing some function on that animal. The examples used will pertain to sheep, but similar needs are present in the raising of other livestock. Among the functions are those of milking a ewe, giving medication to the animal, identification marking, etc.

With larger animals such as horses or cattle, the holding may be done in a special chute which restrains the bodily movement of the animal as well as holding the head in a stanchion. With somewhat smaller animals such as sheep or goats, the restraint on the body may not be so necessary, and if the head alone can be held, the restraint may be enough.

Many prior devices have been devised for holding an animal in a desired position while showing, grooming, shearing or inoculating the animal. For example, as shown in U.S. Pat. No. 4,186,690, in the grooming of animals such as show dogs, the animal is normally placed on a table having a top located several feet above the floor, to position the animal at a height convenient for performing the grooming operation. The animal is usually restrained on the table during the grooming by a tether connected to an arm rigidly supported by the table and extending to a point a short distance above the animal, and the tether is of such a length that it retains the animal in a sitting or at least in a partially upright position on the table. The tether is normally firmly attached to the arm at one end and has a noose at the other end which is placed over the animal's head and is tightened around the neck.

Another apparatus is known as a holddown device which is utilized primarily for holding an animal, such as a calf, on the ground during branding operations. Such a device is shown in U.S. Pat. No. 3,635,199. Still other devices such as the sheep-holding device of U.S. Pat. No. 266,016, provide rigid shackles for holding the sheep's neck and/or legs during shearing.

There are many different types of blocking stands which include a headcatch. The purpose of a traditional blocking stand is to securely hold the livestock in place on a platform above ground level where it can be conveniently "worked". However, as recognized in U.S. Pat. No. 4,942,846, it is often necessary or convenient to perform a desired activity or treatment on an animal while it is in a field or pasture. In this regard, a small livestock head restraint device which is the subject of U.S. Pat. No. 5,329,882 was developed. This small livestock head restraint device may be hand-carried from one location to another, and secured adjacent to typical rail and chain link livestock fencing systems.

Although the above-noted small livestock head restraint device has performed its intended function well, there remains a need for livestock blocking and trimming stands which are strong and versatile, and yet more lightweight than those presently on the market. In this regard, sheep blocking and trimming stands typically include a platform having a steel mesh upper surface welded to a steel or aluminum frame, four legs for positioning the steel mesh platform a pre-determined distance over a ground surface, and a head stand which extends upwardly from the platform to supporting a livestock headrest. Many such stands cannot be adjusted so as to vary the height of the platform, but they may be adjusted to vary the height of the livestock headrest relative to the platform. Additionally, although they may be "broken down" to some extent for purposes of storage and transport, their construction makes this operation less than desirable.

Accordingly, there has been a need for a novel livestock stand which is strong yet lightweight, and which may be fully adjusted to accommodate livestock of different sizes as well as the preferences of different users. Such a livestock stand should include legs which may be pivoted between use and storage positions, and a locking mechanism which is simple to operate and eliminates the need for tools. The present invention fulfills these needs and provides other related advantages.

SUMMARY OF THE INVENTION

The present invention resides in an improved livestock stand which may be adjusted to accommodate the preferences of a wide variety of users as well as a variety of livestock. The livestock stand comprises, generally, a platform for supporting livestock, including an upper supporting surface and a plurality of downwardly extending legs, and a headrest assembly including a support arm connected at one end thereof to the platform, for supporting a livestock headrest over the platform. Means are provided for adjustably positioning the headrest assembly support arm relative to the platform at the connection therebetween. Moreover, means are provided for locking the legs in one of two primary positions.

In a preferred form of the invention, the upper supporting surface of the platform comprises a perforated aluminum sheet. A front leg assembly is connected to the platform and is pivotable between a first folded position and a second extended position, and similarly a rear leg assembly is connected to the platform and is pivotable between a first folded position and a second extended position. Each leg assembly includes means for adjusting the length thereof, which permits the height of the platform upper supporting surface to be adjusted when the leg assemblies are placed in their second extended positions.

The headrest assembly support arm positioning means includes a clamp assembly having a rigid envelope through which the support arm passes, and a clamp screw adjustably positionable relative to the rigid envelope. The headrest assembly support arm includes a lower slot, and the clamp screw extends through the lower slot to position a friction locking plug within the support arm to secure the support arm within the rigid envelope.

The leg assembly locking means include a spring-loaded lock for each leg assembly which is fixed relative to the respective leg assembly. The spring-loaded lock engages a bracket fixed to the platform. The bracket includes a first aperture for receiving an end-shaft portion of the spring-loaded lock when the respective leg assembly is pivoted into the first folded position, and a second aperture for receiving the end- shaft portion of the spring-loaded lock when the respective leg assembly is pivoted into the second extended position.

Means are also provided for adjustably positioning the livestock headrest relative to the headrest assembly support arm. The headrest positioning means includes a clamp assembly through which a mounting channel for the livestock headrest slides. The clamp assembly includes a rigid envelope, which may be simply the upper end of the support arm, through which the mounting channel passes, and a clamp screw which is adjustably positionable relative to the rigid envelope. The clamp screw positions a friction locking plug within the mounting channel to selectively prevent the mounting channel, and thus the livestock headrest, from moving relative to the support arm when the clamp screw is tightened sufficiently.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is a bottom plan view of the livestock stand shown in FIG. 1;

FIG. 3 is a left side elevational view of the livestock stand of the FIGS. 1 and 2;

FIG. 4 is a front elevational view of the livestock stand of FIGS. 1–3;

FIG. 5 is an enlarged, fragmented sectional view taken generally along the line 5—5 of FIG. 4, illustrating the construction of a clamp assembly utilized to adjustably secure a headrest assembly support arm to a portion of a platform, and specifically the front leg assembly;

FIG. 6 is an enlarged, fragmented sectional view taken generally along the line 6—6 of FIG. 1, illustrating the manner in which a perforated aluminum sheet is secured to a frame for the platform;

FIG. 7 is an enlarged, fragmented elevational view taken generally along the line 7—7 of FIG. 1, illustrating the manner in which the platform leg assemblies may be adjusted in order to change the height of the platform when in use; and FIG. 8 is an enlarged, fragmented and partially sectional view taken generally along the line 8—8 of FIG. 1, illustrating a spring-loaded lock assembly utilized to lock the front and rear leg assemblies in either a first folded position or a second extended position.

DETAILED DESCRIPTION OF THE PREFERRED EMBODIMENT

Figure 1:
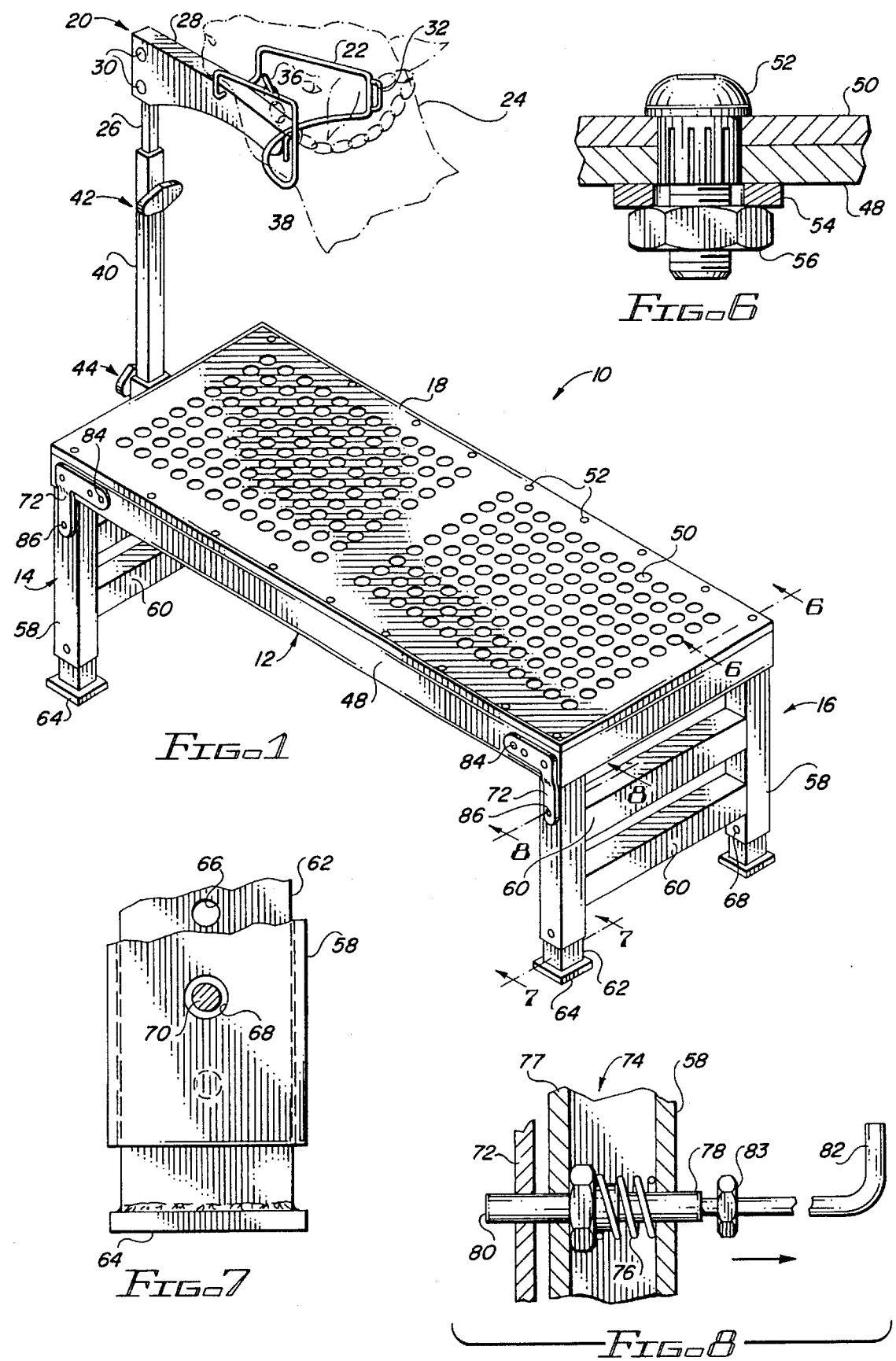
FIG. 1 is a top, rear and left side perspective view of a livestock stand embodying the present invention, illustrating the manner in which a sheep's head (shown in phantom) is secured within a headrest.

As shown in the drawings for purposes of illustration, the present invention is concerned with an improved livestock stand, generally designated in the accompanying drawings by the reference number 10. The livestock stand 10 comprises, generally, a platform assembly including a platform 12, a front leg assembly 14 and a rear leg assembly 16. The leg assemblies 14 and 16 are connectable to the platform 12 for supporting a generally horizontal upper supporting surface 18 a desired distance over the ground. The livestock stand 10 further includes a headrest assembly 20 which is secured to the platform assembly at one end, and supports a headrest 22 at another end over the platform 12. The headrest 22 is adapted to support and securely hold the head 24 of an animal standing on the platform 12.

The headrest assembly 20 includes a generally vertically oriented U-shaped mounting shaft 26, and a headrest arm 28 fixed to an upper end of the mounting shaft by means of bolts 30. The headrest arm 28 extends horizontally away from the mounting shaft 26 over the platform 12. The headrest 22 is welded to the headrest arm 28, and includes a chain anchor 32 and two chain lock stubs 34 and 36. The headrest assembly 20 is similar to that shown in U.S. Pat. No. 5,329,882 entitled SMALL LIVESTOCK HEAD RESTRAINT DEVICE, the contents of which are incorporated herein. The headrest assembly 20 provides means for supporting and securely holding the head 24 of a standing animal in a manner confining the nose of the animal therein.

A chain 38 is utilized in connection with the headrest 22 to hold the head 24 of the animal in place. One end of the chain 38 is secured to the chain anchor 32. As shown in FIG. 1, when the animal's head 24 is properly placed within the headrest 22, the chain 38 is typically looped behind the head of the animal beneath its ears and secured to the first chain lock stub 34 and then, in turn, to the second chain lock stub 36. This particular manner of securing the head 24 of the animal within the headrest 22 is adequate under most circumstances. However, it is preferred that the chain 38 be of sufficient length to permit it to be looped about the nose of the animal, if desired.

In accordance with the present invention, the mounting shaft 26 of the headrest assembly 20 is slidingly received into a vertical support arm 40 which extends from the platform 12 upwardly. The vertical support arm 40 includes an upper clamp assembly 42 which frictionally engages the mounting shaft 26 to permit the height of the headrest arm 28 and the headrest 22 to be adjusted relative to the upper end of the support arm 40. The support arm 40 itself is received and supported within a pair of lower clamp assemblies 44 and 46 secured to the platform assembly. More specifically, the first lower clamp assembly 44 is secured to the platform 12, whereas the second lower clamp assembly 46 is secured to a portion of the front leg assembly 14. Both of the lower clamp assemblies 44 and 46 slidingly receive the lower end of the vertical support arm 40 in a manner which permits height adjustment of the support arm relative to the platform 12.

The platform 12 comprises a generally rectangular frame 48 and a perforated aluminum sheet 50 secured atop the frame. The perforated sheet 50 lends great structural integrity to the livestock stand 12 and yet its construction allows it to be cleaned easily after use with livestock, and replaced if necessary. In this regard, as shown best in FIG. 6, the perforated sheet 50 is secured to the frame 48 utilizing low profile, round head countersunk bolts 52 placed through apertures about the periphery of the sheet 50 and designed so that the top of the bolts 52 lie generally flush with the upper surface of the perforated sheet. The threaded shafts of the bolts 52 extend downwardly through aligned apertures in the sheet 50 and the frame 48, and a washer 54 is placed over the exposed end of each bolt prior to tightening a nut 56 thereon.

The front and rear leg assemblies 14 and 16 are virtually identical, and include a pair of downwardly extending outer leg shafts 58 which are interconnected by a pair of cross beams 60. The upper end of each outer leg shaft 58 is pivotally secured to an adjacent portion of the frame 48 so as to permit the leg assemblies to pivot between a first folded position wherein the leg assemblies lie generally adjacent to the underside of the perforated sheet 50, and a second extended position as shown in the drawings.

The lower ends of the outer leg shafts 58 are open in order that each may receive an inner leg shaft 62 of a ground-engaging foot 64. As shown best in FIG. 7 each inner leg shaft 62 is provided with a series of aligned apertures 66 extending horizontally through the shaft, which may be aligned with a single aperture 68 extending through each outer leg shaft 58. The overall effective length of the front and rear leg assemblies 14 and 16 may be adjusted by simply adjusting the extent to which the inner leg shafts 62 extend within the outer leg shafts. This advantageously permits the vertical height of the upper supporting surface 18 of the platform 12 to be adjusted to meet the needs of the particular user, and is accomplished by simply aligning the outer leg aperture 68 with a desired one of the inner leg apertures 66, and placing a dowel or pin 70 through the aligned apertures to prevent relative movement between the inner and outer leg shafts 62 and 58.

In order to lock the leg assemblies 14 and 16 in their first and second positions, a leg assembly positioning bracket 72 is secured to each corner of the platform frame 48 adjacent to a respective one of the outer leg shafts 58. As shown in FIG. 8, a spring loaded lock 74 is positioned relative to a respective outer leg shaft 58 in order to engage the positioning bracket 72. Each spring-loaded lock 74 includes a spring 76 and a bushing insert 77 disposed within each outer leg shaft 58 over a locking pin or shaft 78 having a bracket-engaging end 80. A handle portion 82 is connected to the locking pin or shaft 78 at a nut 83. The spring 76 urges the end 80 of the shaft 78 outwardly from the outer leg shaft 58 in the absence of a manual counter-spring force applied to the handle 82 in the opposite direction.

The positioning bracket 72 includes a first aperture 84 positioned so as to receive the end 80 of the shaft 78 when the respective leg assembly is pivoted into the first folded position. The positioning bracket 72 also includes a second aperture 86 located so as to receive the end 80 of the shaft 78 when the respective leg assembly is pivoted into the second extended position. In order to disengage the end portions 80 of the shaft 78 from either of the apertures 84 or 86, the user simply pulls the handles 82 away from the respective outer leg shaft 58, which then allows the respective leg assembly 14, 16 to be pivoted relative to the platform frame 48.

The lower clamp assemblies 44 and 46 are virtually identical, and are utilized, as mentioned previously, to adjustably support the vertical support arm 40. The first lower clamp assembly 44 is secured adjacent to the platform frame 48, whereas the second lower clamp assembly 46 is secured adjacent to a cross beam 60 of the front leg assembly 14. With reference to FIG. 5, the lower clamp assemblies 44 and 46 each include a pair of clamp assembly support brackets 88 which are welded to, respectively, either the platform frame 48 or the adjacent cross beam 60. An enveloping tube 90, rectangular in cross section, is welded between the support brackets 88, and is dimensioned to closely yet slidingly receive the lower end of the vertical support arm 40 therein. A clamp screw 92 having a handle 94 is threaded through a collar nut 96 which extends through an aperture of the enveloping tube 90. The collar nut 96 is fixed to the enveloping tube 90 by means of an interior nut 98 threaded over a collar portion 100 of the collar nut 96. The clamp screw 92 supports a friction locking plug 102 at an end thereof opposite the handle 94, which is designed to be received internally within the vertical support arm 40.

In order to accommodate the structure of the lower clamp assemblies 44 and 46, the lower end of the vertical support arm 40 includes an open face or slot 104 through which the clamp screw 92 and the collar nut 96 pass as the vertical support arm 40 is slidingly received through the enveloping tubes 90. The vertical support arm 40 is held within the enveloping tubes 90 by turning the clamp screws 92 through the collar nuts 96 so as to press the friction locking plugs 102 into engagement with an interior surface of the support arm 40. This, in effect, creates a friction lock between the support arm 40 and the friction locking plugs 102. Because the contact surfaces are internal relative to the support arm 40, visible marring of livestock stand 10 components is minimized. Further, the lock effected through the clamp assemblies 44 and 46 may be easily loosened by simply turning the handle 94 counterclockwise to withdraw the friction locking plug 102 from engagement with the interior surface of the support arm 40.

The upper clamp assembly 42 is very similar to the lower clamp assemblies 44 and 46 just described. The enveloping tube 90 may be simply the upper end of the vertical support arm 40. The mounting shaft 26 of the headrest assembly 20 serves the same function as the lower end of the vertical support arm 40 in the lower clamp assemblies 44 and 46, in that the friction locking plug 102 carried by the clamp screw 92 engages an interior surface of the mounting shaft 26. Of course, if the upper end of the support arm 40 serves the purpose of the enveloping tube 90, there is no need for the supporting brackets 88. In all other respects, however, the upper clamp assembly 42 functions identically as the lower clamp assemblies 44 and 46.

In use, the livestock stand 10 is usually transported in a folded/disassembled configuration. More particularly, the front and rear leg assemblies 14 and 16 are pivoted into the first folded position (as indicated by the arcuate arrows of FIG. 3), and the spring-loaded locks 74 engage the first aperture 84 of the leg assembly positioning brackets 72 to keep the leg assemblies in the first folded position. The vertical support arm 40 is removed from the two lower clamp assemblies 44 and 46, and the headrest assembly 20 may be removed from the vertical support arm.

To set up the livestock stand 10 and ready it for use, the handles 82 of the spring-loaded locks 74 are pulled toward one another to disengage the ends 80 of the shafts 78 from within the first apertures 84 of the leg assembly positioning brackets 72. The front and rear leg assemblies 14 and 16 are pivoted into their second extended positions, as shown in the drawings, and locked into place by ensuring that the ends 80 of the shafts 78 of the spring-loaded locks 74 are positioned within the second apertures 86 of the leg assembly positioning brackets 72. The relationship of the inner leg shafts 62 with respect to the outer leg shafts 58 may be adjusted to raise or lower the upper supporting surface 18 of the platform 12. This is accomplished by aligning the selected inner leg aperture 66 with the respective outer leg aperture 68, and inserting the dowel or pin 70 to hold them together.

The vertical support arm 40 is placed within the lower clamp assemblies 44 and 46 such that the slot 104 faces forwardly to permit the clamp screws to extend into the interior of the vertical support arm 40. When the support arm is positioned as desired, the handles 94 are turned in order to tighten the friction locking plugs 102 against the interior of the support arm 40 and thus lock it into place. The headrest assembly 20 is positioned atop the vertical support arm 40 by inserting the mounting shaft 26 into the upper end of the support arm. The upper clamp assembly 42 is utilized to secure it in place at the desired vertical height. More specifically, after the mounting shaft 26 is inserted into the upper end of the support arm 40, the clamp screw 92 is turned in order to press the friction locking plug 102 against an interior surface of the mounting shaft 26 to lock the headrest assembly 20 relative to the upper end of the vertical support arm 40.

From the foregoing it is to be appreciated that the livestock stand 10 is fully adjustable and yet sufficiently sturdy so as to withstand its intended working environment. The perforated aluminum sheet 50 forming the upper supporting surface 18 is particularly advantageous in comparison with the wire mesh upper surfaces typically found in prior livestock stands. The livestock stand 10 may be conveniently broken down to facilitate transport and storage, and yet quickly and easily set up when needed.

Although a particular embodiment of the invention has been described in detail for purposes of illustration, various modifications may be made without departing from the spirit and scope of the invention. Accordingly, the invention is not to be limited, except as by the appended claims.

I claim:

1. A livestock stand, comprising:

a platform for supporting livestock, including an upper supporting surface;

a headrest assembly including a support arm connected at one end thereof to the platform, and a livestock headrest connected to the support arm at another end thereof;

a front leg assembly connected to the platform and pivotable between a first folded position and a second extended position;

a rear leg assembly connected to the platform and pivotable between a first folded position and a second extended position; and means for adjustably positioning the headrest assembly support arm relative to the platform at the connection therebetween, including a first clamp assembly fixed to the platform and a second clamp assembly fixed to the front leg assembly and aligned with the first clamp assembly, through which the headrest assembly support arm slides.

2. The livestock stand of claim 1, wherein the clamp assemblies each include a rigid envelope through which the headrest assembly support arm passes, a clamp screw adjustably positionable through a front wall of the rigid envelope, and a friction locking plug within the support arm and aligned with the clamp screw to provide means for clamping an adjacent portion of the support arm between the friction locking plug and a rear wall of the rigid envelope.

3. The livestock stand of claim 2, wherein the headrest assembly support arm includes a lower slot, and wherein the clamp screw extends through the lower slot to position the friction locking plug within the support arm.

4. The livestock stand of claim 1, wherein the headrest assembly includes means for adjustably positioning the livestock headrest relative to the headrest assembly support arm.

5. The livestock stand of claim 4, wherein the positioning means includes a third clamp assembly through which a mounting channel for the livestock headrest slides.

6. The livestock stand of claim 5, wherein the third clamp assembly includes a rigid envelope through which the mounting channel passes, a clamp screw adjustably positionable through a rear wall of the rigid envelope, and a friction locking plug within the mounting channel and aligned with the clamp screw to provide means for clamping an adjacent portion of the mounting channel between the friction locking plug and a front wall of the rigid envelope.

7. The livestock stand of claim 1, including means for locking each leg assembly in the first and the second positions, and wherein the front and rear leg assemblies each include a plurality of legs.

8. The livestock stand of claim 7, wherein the locking means includes a spring-loaded lock fixed relative to each leg assembly, the spring-loaded lock engaging another portion of the platform when the leg assemblies are pivoted into their first and second positions.

9. The livestock stand of claim 8, wherein each spring-loaded lock comprises a coil spring biased locking shaft supported by a respective leg, and wherein the locking means further includes a lock-engaging bracket fixed to the platform, having a first aperture for receiving an end-shaft portion of the spring-loaded lock when the respective leg assembly is pivoted into the first folded position, and a second aperture for receiving the end-shaft portion of the spring-loaded lock when the respective leg assembly is pivoted into the second extended position.

10. The livestock stand of claim 1, wherein the upper supporting surface of the platform comprises a perforated aluminum sheet.

11. A livestock stand, comprising:

a platform for supporting livestock, including an upper supporting surface;

a headrest assembly including a support arm connected at one end thereof to the platform, for supporting a livestock headrest over the platform;

a front leg assembly including a plurality of legs, connected to the platform and pivotable between a first folded position and a second extended position;

a rear leg assembly including a plurality of legs, connected to the platform and pivotable between a first folded position and a second extended position; and means for locking each leg assembly in its first and second positions, the locking means including a spring-loaded lock fixed relative to each leg which comprises a coil spring biased locking shaft supported by a respective leg and a lock-engaging bracket fixed to the platform adjacent to each leg, having a first aperture for receiving an end-shaft-portion of the spring-loaded lock when the respective leg assembly is pivoted into the first folded position, and a second aperture for receiving the end-shaft portion of the spring-loaded lock when the respective leg assembly is pivoted into the second extended position.

12. The livestock stand of claim 11, including means for adjustably positioning the headrest assembly support arm relative to the platform at the connection therebetween, including a first clamp assembly fixed to the platform and a second clamp assembly fixed to the front leg assembly and aligned with the first clamp assembly, through which the headrest assembly support arm slides.

13. The livestock stand of claim 12, wherein the headrest assembly includes means for adjustably positioning the livestock headrest relative to the headrest assembly support arm, the positioning means including a third clamp assembly through which a mounting channel for the livestock headrest slides.

14. The livestock stand of claim 13, wherein the third clamp assembly includes a rigid envelope through which the mounting channel passes, a clamp screw adjustably positionable through a rear wall of the rigid envelope, and a friction locking plug within the mounting channel and aligned with the clamp screw to provide means for clamping an adjacent portion of the mounting channel between the friction locking plug and a front wall of the rigid envelope.

15. The livestock stand of claim 12, wherein the clamp assemblies each include a rigid envelope through which the headrest assembly support arm passes, a clamp screw adjustably positionable through a front wall of the rigid envelope, and a friction locking plug within the support arm and aligned with the clamp screw to provide means for clamping an adjacent portion of the support arm between the friction locking plug and a rear wall of the rigid envelope.

16. The livestock stand of claim 15, wherein the headrest assembly support arm includes a lower slot, and wherein the clamp screw extends through the lower slot to position the friction locking plug within the support arm.

17. The livestock stand of claim 11, wherein the upper supporting surface of the platform comprises a perforated aluminum sheet.

18. The livestock stand of claim 11, wherein the front and rear leg assemblies each include means for adjusting the length of the legs thereof.

19. A livestock stand, comprising:
- a platform for supporting livestock, including an upper supporting surface comprising a perforated aluminum sheet;
- a headrest assembly including a support arm connected at one end thereof to the platform, and a livestock headrest connected to the support arm at another end thereof;
- a front leg assembly including a plurality of legs, connected to the platform and pivotable between a first folded position and a second extended position;
- a rear leg assembly including a plurality of legs, connected to the platform and pivotable between a first folded position and a second extended position;
- means for locking each leg assembly in its first and second positions, the locking means including a spring-loaded lock fixed relative to each leg which comprises a coil spring biased locking shaft supported by a respective leg, and a lock engaging bracket fixed to the platform adjacent to each leg, having a first aperture for receiving an end-shaft portion of the spring-loaded lock when the respective leg assembly is pivoted into the first folded position, and a second aperture for receiving the end-shaft portion of the spring-loaded lock when the respective leg assembly is pivoted into the second extended position;
- means for adjustably positioning the headrest assembly support arm relative to the platform at the connection therebetween, including a first clamp assembly fixed to the platform and a second clamp assembly fixed to the front leg assembly and aligned with the first clamp assembly, through which the headrest assembly support arm slides, the first and second clamp assemblies each including a rigid envelope through which the headrest assembly support arm passes, a clamp screw adjustably positionable through a front wall of the rigid envelope, and a friction locking plug within the support arm and aligned with the clamp screw to provide means for clamping an adjacent portion of the support arm between the friction locking plug and a rear wall of the rigid envelope; and
- means for adjustably positioning the livestock headrest relative to the headrest assembly support arm, the headrest positioning means including a third clamp assembly through which a mounting channel for the livestock headrest slides.

* * * * *